(12) United States Patent
Jang (10) Patent No.: US 7,827,503 B2
(45) Date of Patent: Nov. 2, 2010

(54) AUTOMATICALLY GENERATING A SEARCH RESULT IN A SEPARATE WINDOW FOR A DISPLAYED SYMBOL THAT IS SELECTED WITH A DRAG AND DROP CONTROL

(75) Inventor: Jeong Sik Jang, Kyeonggi-Do (KR)

(73) Assignee: Yahoo! Inc., Sunnyvale, CA (US)

( * ) Notice: Subject to any disclaimer, the term of this patent is extended or adjusted under 35 U.S.C. 154(b) by 317 days.

(21) Appl. No.: 11/190,685

(22) Filed: Jul. 27, 2005

(65) Prior Publication Data
US 2007/0028184 A1 Feb. 1, 2007

(51) Int. Cl.
*G06F 3/048* (2006.01)
(52) U.S. Cl. .......................... 715/769; 707/760; 704/8; 715/703
(58) Field of Classification Search .......... 715/769, 715/703; 707/3, 4, 760; 704/8
See application file for complete search history.

(56) References Cited

U.S. PATENT DOCUMENTS

| | | | | |
|---|---|---|---|---|
| 6,092,036 | A * | 7/2000 | Hamann | 704/8 |
| 6,393,443 | B1 * | 5/2002 | Rubin et al. | 715/533 |
| 6,421,067 | B1 * | 7/2002 | Kamen et al. | 715/719 |
| 6,476,834 | B1 * | 11/2002 | Doval et al. | 715/863 |
| 6,519,584 | B1 * | 2/2003 | Tognazzini et al. | 707/3 |
| 6,563,913 | B1 * | 5/2003 | Kaghazian | 379/93.24 |
| 7,100,123 | B1 * | 8/2006 | Todd et al. | 715/862 |
| 7,233,940 | B2 * | 6/2007 | Bamberger et al. | 707/3 |
| 7,240,052 | B2 * | 7/2007 | Sidlosky et al. | 707/3 |
| 2002/0130837 | A1 * | 9/2002 | Johnston et al. | 345/156 |
| 2003/0126136 | A1 * | 7/2003 | Omoigui | 707/10 |
| 2004/0015490 | A1 * | 1/2004 | Snyder et al. | 707/3 |
| 2004/0054627 | A1 * | 3/2004 | Rutledge | 705/50 |
| 2006/0136248 | A1 * | 6/2006 | Hughes et al. | 705/1 |
| 2007/0005590 | A1 * | 1/2007 | Thrasher | 707/5 |

FOREIGN PATENT DOCUMENTS

WO 00/74377 12/2000

OTHER PUBLICATIONS

"1-Click Answers", Answers.com—Product Info., pp. 1-2, can be found at http://www.answers.com/mani/product_info/jsp.
Korean Non-Final Office Action for Korean Patent Application No. 10-2005-0103656 mailed Dec. 13, 2007.

* cited by examiner

*Primary Examiner*—Sara England
(74) *Attorney, Agent, or Firm*—Frommer Lawrence & Haug LLP; Jamie L. Wiegand (57) ABSTRACT

A system and method are directed towards using an icon, animation, or other indicator to search for content associated with one or more words, language characters, or other symbols on a display. A pointing device, such as a mouse, is used to drag and drop the indicator onto a displayed symbol. Display data near the drop location of the indicator are evaluated to determine one or more words or other symbols. A determined symbol is submitted to a search system to access a definition, a translation, an encyclopedia entry, an audio clip, an image, and/or other content associated with the determined symbol. The indicator may be controlled on a client device which initiates the search by submitting a search request over a network to a server. Resulting content is displayed in a separate result window, which may also include tabs, buttons, and/or other elements for selecting other content.

19 Claims, 8 Drawing Sheets

AUTOMATICALLY GENERATING A SEARCH RESULT IN A SEPARATE WINDOW FOR A DISPLAYED SYMBOL THAT IS SELECTED WITH A DRAG AND DROP CONTROL

FIELD OF ART

The present invention relates generally to data searching, and more particularly, but not exclusively, to a user interface enabling a user to drag and drop a selection indictor onto a displayed symbol to initiate a search for content associated with the symbol.

BACKGROUND

While viewing text, human language characters, images, hyperlinks, and/or other content on an electronic display, users sometimes wish to obtain further information about a certain portion of the content. For example, a user may wish to obtain a definition or a translation of a word that is displayed. As another example, a user may wish to obtain an explanation of a language character, such as an Asian language character that is not used very frequently.

Some applications allow a user to move a mouse pointer over a displayed word and wait for a predetermined period, after which a dictionary search is performed on the displayed word. Such applications generally perform a search anytime the mouse pointer is stationary for the predetermined period, even if the user does not desire a search on the word that the mouse pointer happens to be stationary over. This may use computing resources unnecessarily. Similarly, some applications allow a user to hold a hotkey and click on a displayed word. Such applications require coordination between the keyboard and the mouse, which may take the user's eyes off of the display to coordinate the selection operation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the following embodiments of the present invention are directed towards providing a method and system for searching for content associated with one or more words selected with a drag and drop selection icon.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, an administrative user and/or other person using an electronic device.

Illustrative Operating Environment

Figure 1:
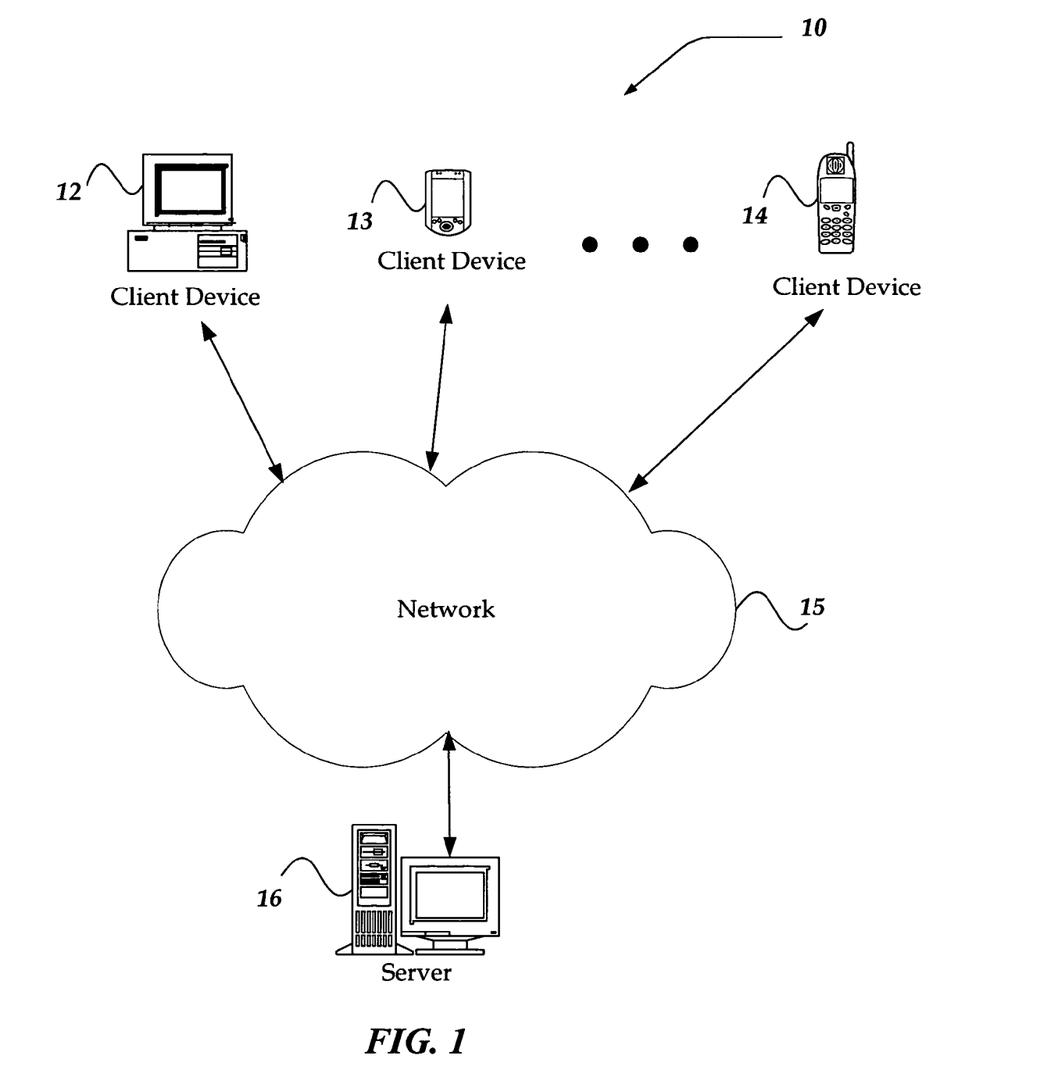
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and a server 16. Network 15 is in communication with and enables communication between each of client devices 12-14, and server 16.

Client devices 12-14 may include virtually any computing device, including devices capable of receiving and sending a message over a network, such as network 15, to and from another computing device, such as server 16, each other, and the like. The set of such devices may include devices that are usually considered general purpose devices and typically connect using a wired communications medium such as personal computers, multiprocessor systems, microprocessorbased or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to instruct the client device to perform operations, and to control settings, such as display settings, presence settings, and the like. Each client device also includes a communication interface that enables the client device to send and receive messages from another computing device employing the same or a different communication mode, including, but not limited to email, instant messaging (IM), short message service (SMS) messaging, multi-media system (MMS) messaging, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of a general purpose client computing device, such as a client device 20, is described in more detail below in conjunction with FIG. 2. Briefly, client device 20 may include any computing device, including those capable of connecting to network 15 to enable a user to communicate with other client devices and/or server 16. Client device 20 may include many more components than those shown. The components shown, however, are sufficient to disclose an illustrative embodiment for practicing the invention. Many of the components of client device 20 may also be duplicated in server 16 and/or other server devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX or LINUX™. The operating system may also include, or interface with a Java virtual machine module that enables control of hardware components and/or operating system operations via Java application programs.

Mass memory 24 further includes one or more data storage units 32, which can be utilized by client device 20 to store, among other things, programs 34 and/or other data. Programs 34 may include computer executable instructions which can be executed by client device 20 to implement schedulers, calendars, web services, transcoders, database programs, word processing programs, spreadsheet programs, and so forth. Programs 34 and/or a browser 36 may also include computer executable instructions which can be executed by client device 20 (and/or server 16) to implement an HTTP handler application for transmitting, receiving and otherwise processing HTTP communications. Similarly, programs 34 and/or browser 36 can include an HTTPS handler application for handling secure connections, such as initiating communication with an external application in a secure fashion. Accordingly, programs 34 and/or browser 36 can process web pages, audio, video, and enable telecommunication with another user of another electronic device. In addition, programs 34 and/or browser 36 may include computer executable instructions, which may be run under control of operating system 31 to enable instant messaging, SMS, email, and/or other messaging services. Similarly, client device 20 and/or a server device configured much like client device 20, can include a messaging module, which may further provide routing, access control, and/or other server-side messaging services.

In addition, mass memory 24 stores a search module 38, which determines one or more selected words selected by a user, and enables a search for content related to the selected word(s). Search module 38 may include a database of the content and/or access an external content source. Search module 38 may be entirely contained within client device 20, entirely contained within server 16, or divided among client devices and/or server 16, which may communicate with each other to perform a content search. Search module 38 may also include communication handlers for communicating with a server and/or other computing device.

Figure 2:
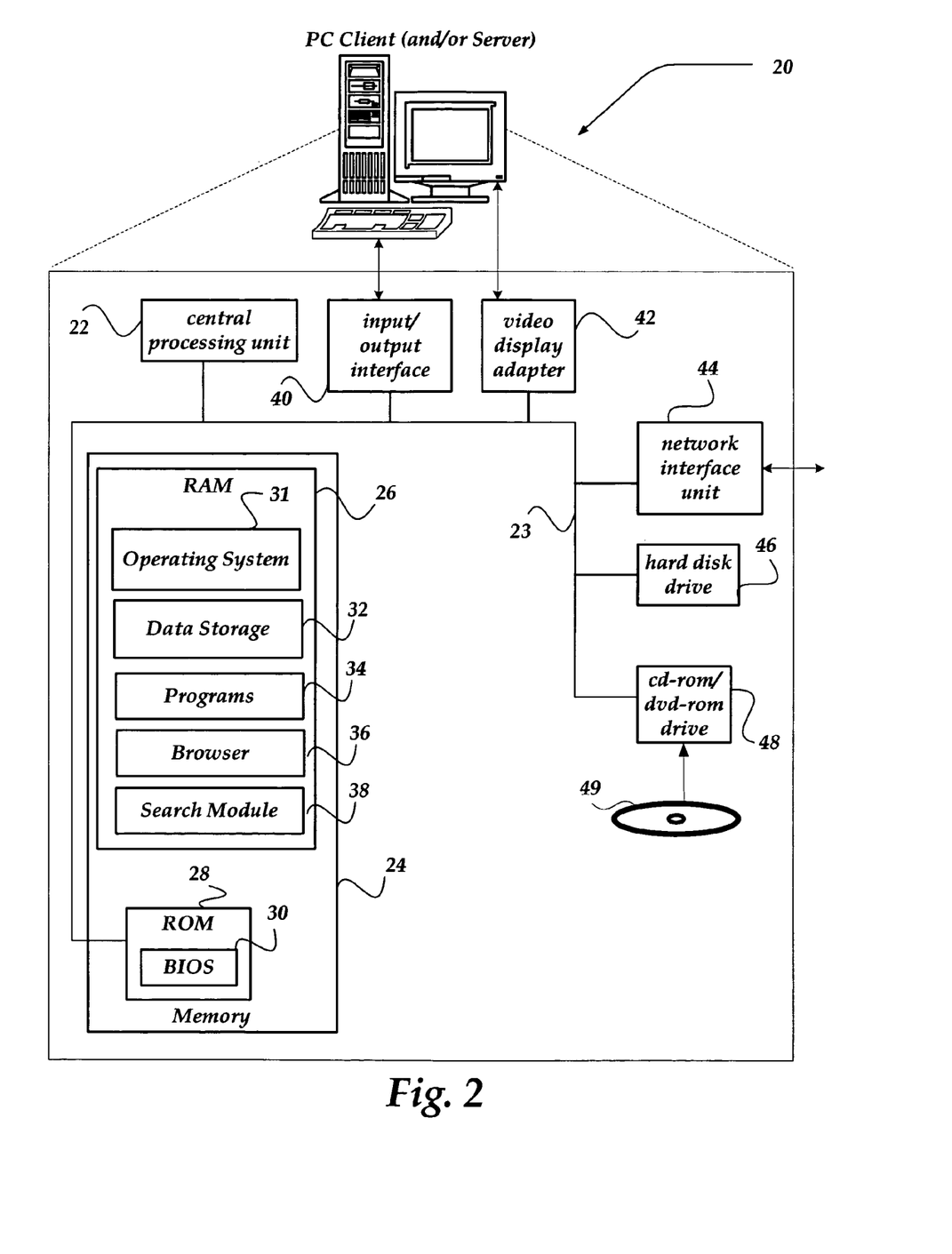
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31, programs 34, browser 36, and/or search module 38. Interaction with the user interface includes visual interaction via a display, and a video display adapter 42.

For higher capability client devices such as a personal computer, client device 20 may include a removable media drive 48 and/or a permanent media drive 46 for computer-readable storage media. Removable media drive 48 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, client device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Illustrative User Interface

Figure 3:
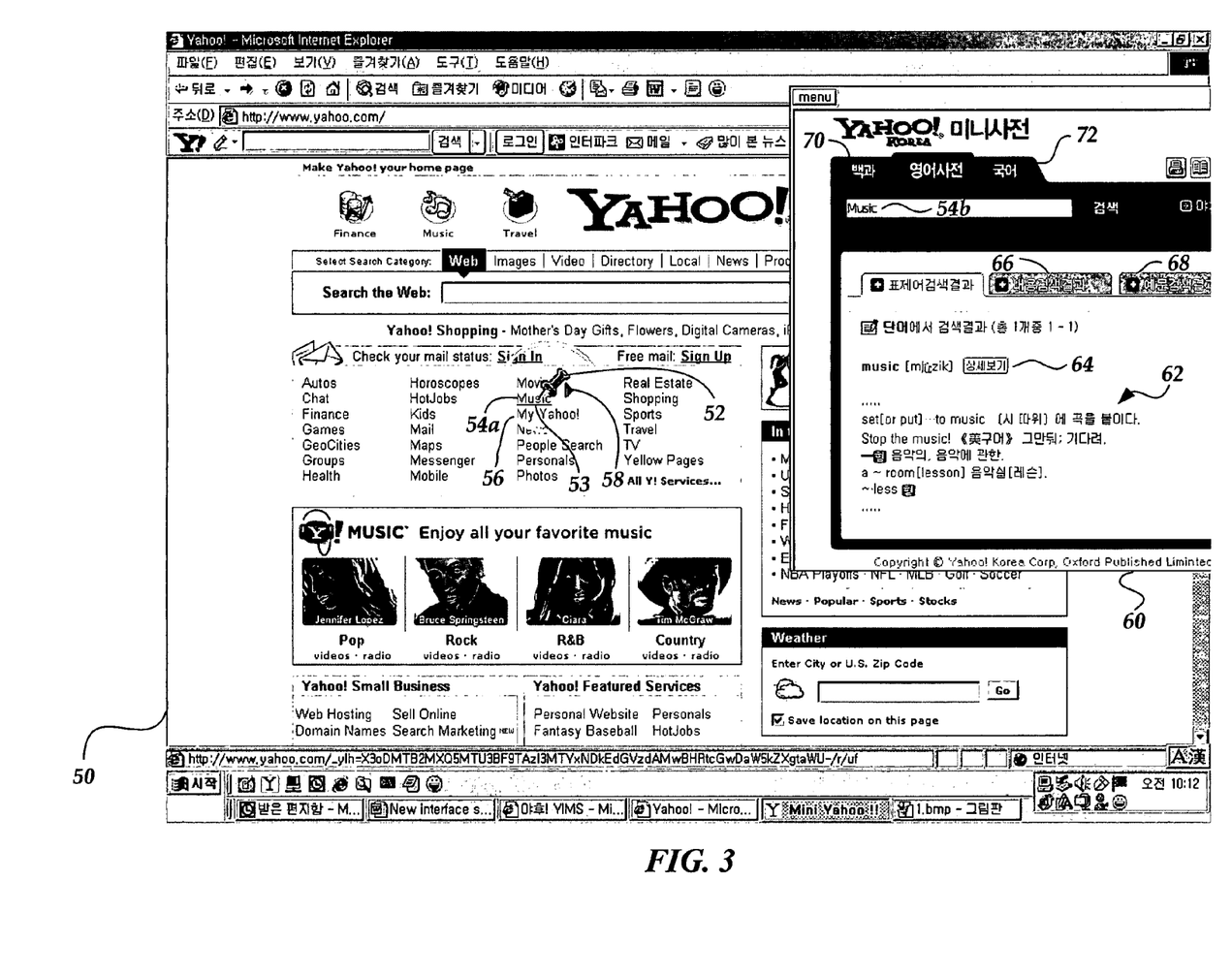
FIG. 3 is a screen shot illustrating a browser window in which a selection icon is used to identify a selected word.

FIG. 3 is a screen shot illustrating a browser window 50 in which a selection icon 52 is used to identify a selected word 54a. In this example, selection icon 52 is displayed as a push-pin, which a user may drag and drop anywhere in the display area with a pointing device such as a mouse. Any graphical icon and/or animated image may be used, such as a pen icon, an animated animal, an emoticon, and the like. Selection icon 52 may also optionally include a locating ring 56 or other indicator to help a user locate selection icon 52 on the display. Selection icon 52 and/or locating ring 56 may blink, change colors, rotate, and/or perform other animations to assist the user in locating and moving the icon, highlighting a selected word or symbol, or otherwise enhancing the use of selection icon 52. For example, an animated underline 53 may be drawn when selection icon 52 is dropped onto selected word 54a. Alternatively, a box may be drawn around selected word 54a, a highlighting color may be placed over selected word 54a, the color or font of selected word 54a may change, a sound may be played, and/or other enhancement. Selection icon 52 may also include an icon tab 58, which may indicate a direction in which the user may look to find a results window 60. In addition, or alternatively, the user may select icon tab 58 to access an input field, a local menu of settings options, and/or other features available through selection icon 52. Samples are shown in FIGS. 4 and 5.

When the user drops selection icon 52 onto a displayed word, the word (and/or nearby words) are determined. The determined word or words are submitted to a search, and results are displayed in a results window, such as results window 60 of FIG. 3. Results window 60 may comprise a browser window, an application window, or other display window. Results may include a definition 62 of the determined word(s), a translation into another language, a phonetic spelling for pronunciation, and the like. A detail button 64 of FIG. 3 may also be used to access another page within the results window that provides more information. The detailed information page may include other buttons and controls such as a speaker icon (shown in FIG. 4), which the user may activate to play the pronunciation or other audio sound relevant to the determined word(s). Those skilled in the art will recognize that a setting may be used to cause an audio sound to be played automatically. The user may further select tabs within results window 60 of FIG. 3 to obtain other additional information. For example, the user may select tabs 66 and/or 68 to access encyclopedia entries, synonyms, and/or other information associated with the determined word(s). Similarly, the user may select search tabs, such as search tabs 70 and 72 to perform alternate searches. For example, the user may chose to search for images, web search results, directory listings, and/or other search information by selecting a corresponding search tab. Results window 60 displays a determined word 54b in a search entry field. Determined word 54b corresponds to selected word 54a, and indicates the search word(s) submitted for the initial search, or that may be suggested for alternate searches. The user may also enter a new search term into the search entry field to obtain alternate information in results window 60.

Figure 4:
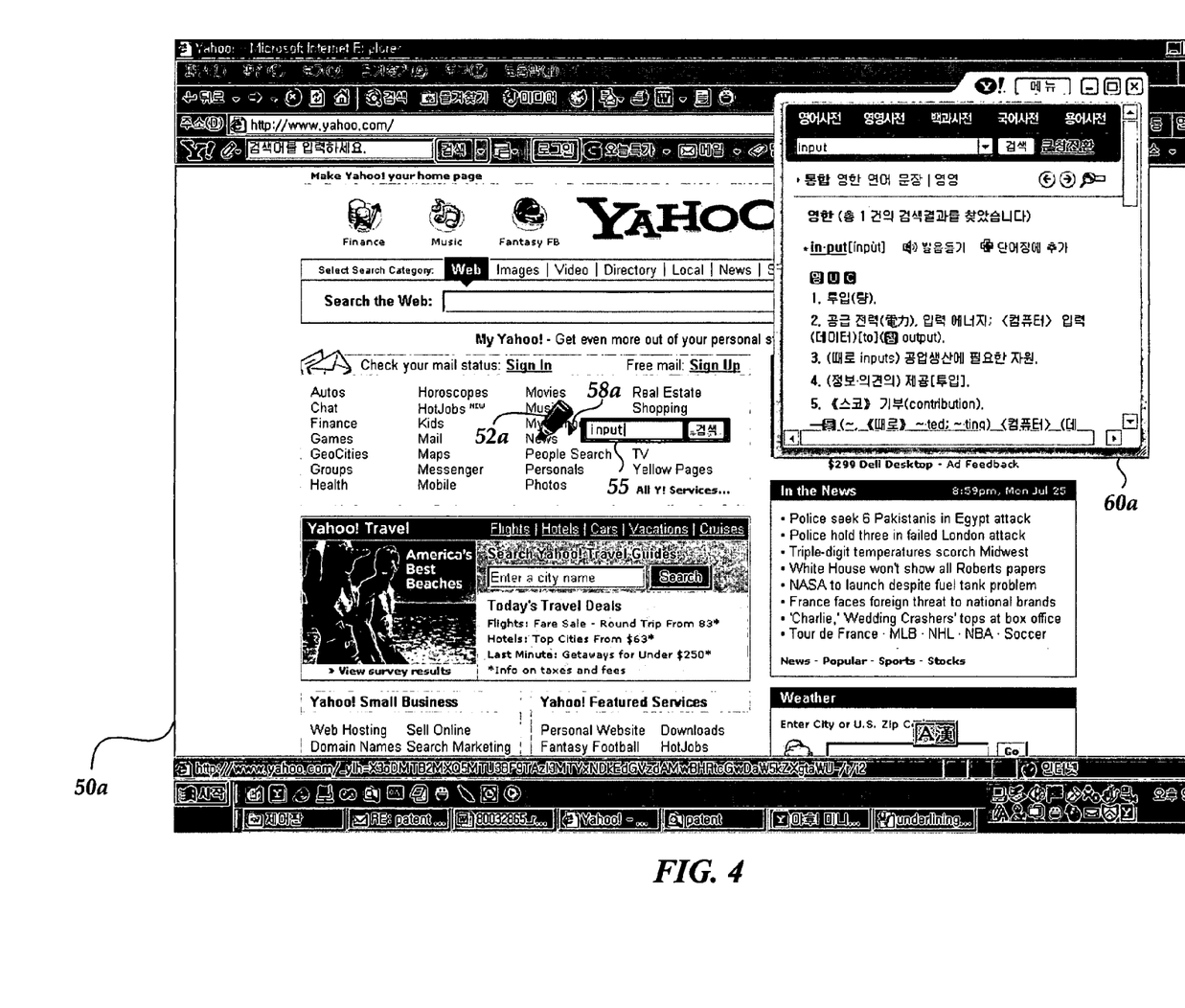
FIG. 4 is a screen shot illustrating a browser window in which an input box is shown for entering a word to submit for searching.

FIG. 4 is a screen shot illustrating a browser window 50a in which an input box 55 is shown for entering a word to submit for searching. As discussed above, the user may select icon tab 58a, to reveal input box 55. In this example, a selection icon 52a is displayed as a pen icon. The word under selection icon 52a is no longer selected while input box 55 is active. Instead, an entered word is searched. In this example, the entered word "input" is searched and results are displayed in a results window 60a.

Figure 5:
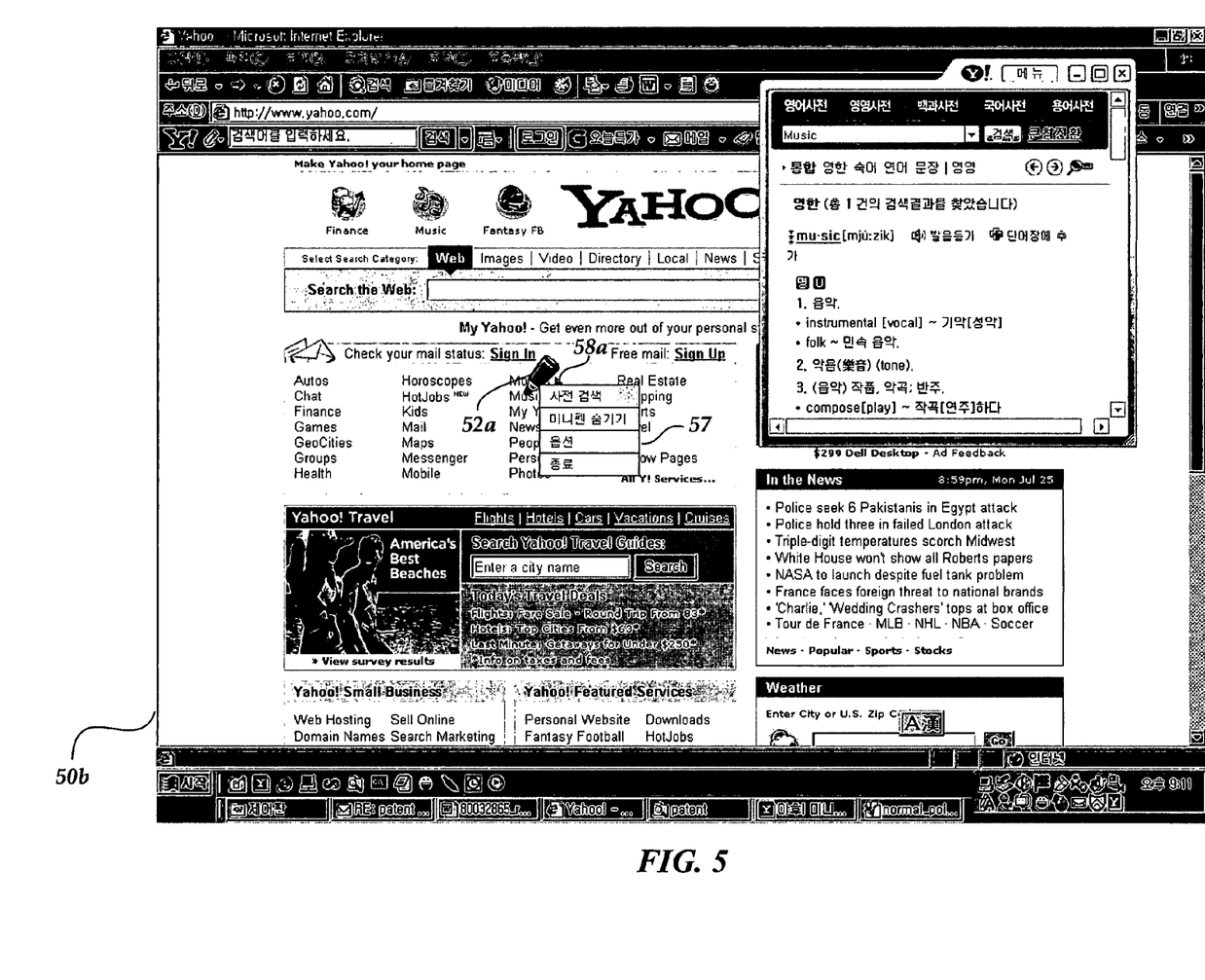
FIG. 5 is a screen shot illustrating a browser window in which a menu is shown for selecting options related to selection icon.

FIG. 5 is a screen shot illustrating a browser window 50b in which a menu 57 is shown for selecting options related to selection icon 52a. The menu may be activated by right-clicking on selection icon tab 58a or on any portion of selection icon 52a. Menu 57 may enable the user to select a different graphical icon, to a turn locating ring on or off, to control blinking speed, to control a resolution of a selection area for selecting words on the display, to scroll through a history of selected words, and/or other options.

Figure 6:
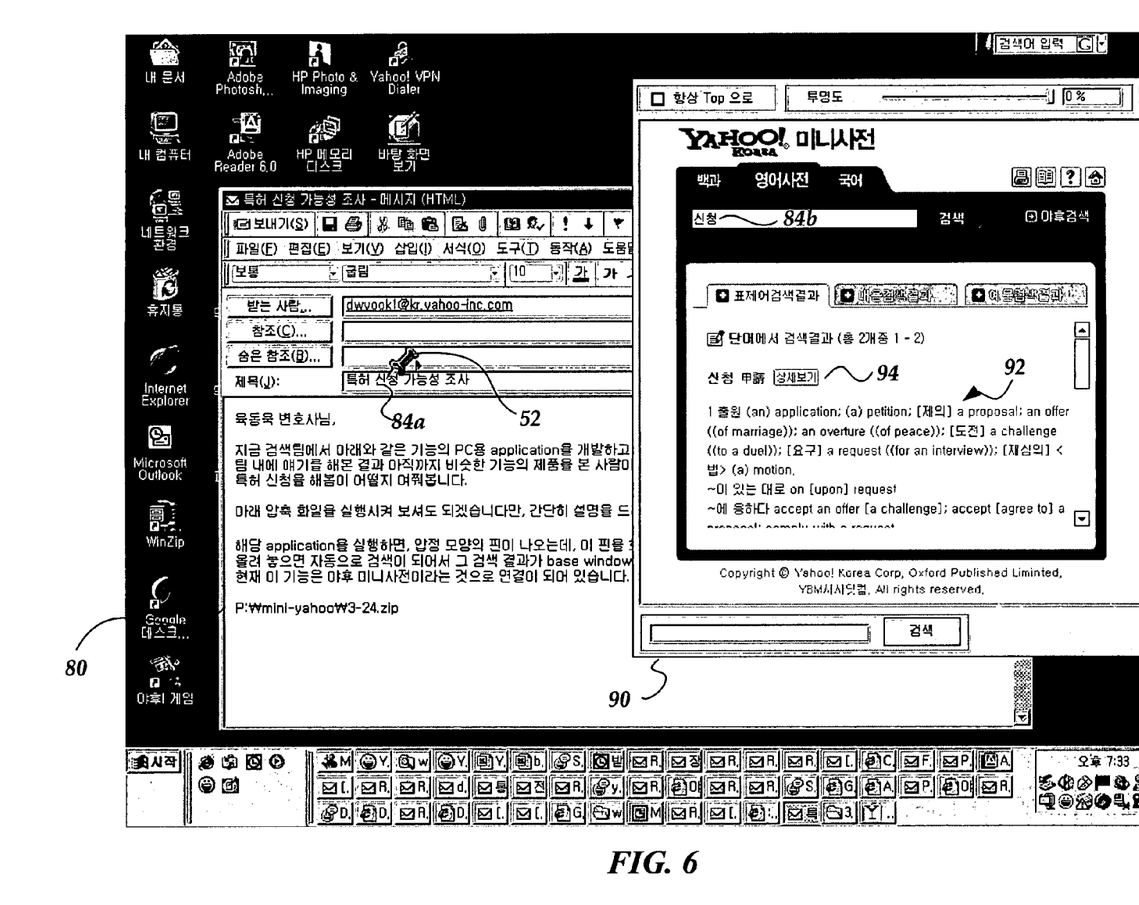
FIG. 6, is a screen shot illustrating an email message window in which selection icon is used to identify a selected symbol.

FIG. 6, is a screen shot illustrating an email message window 80 in which selection icon 52 is used to identify a selected symbol 84a. In this example, selected symbol 84a comprises a pair of Korean language characters, but may comprise any text, graphic, image, or the like. The selected symbols in the display are evaluated to arrive at a determined symbol 84b, which is displayed in a results window 90 along with search results. Results can again include a definition 92, a pronunciation 94, a translation, and/or other information. Results window 90 can be set to remain visible at all times or moved to a background position if focus changes to another window. Also, multiple results windows may be displayed. Each results window may correspond to a one of a sequence of symbols selected with selection icon 52. Alternatively, or in addition, each results window may correspond to one of a plurality of separate selection icons, which may be dragged and dropped to a plurality of symbols/words. The selection icons can be dropped onto any symbols in any window, such as those in a client application window, those in browser window displaying a markup document, those on the "desktop" of the operating system graphical user interface, those in buttons, and the like.

Illustrative Architecture and Logic

Figure 7:
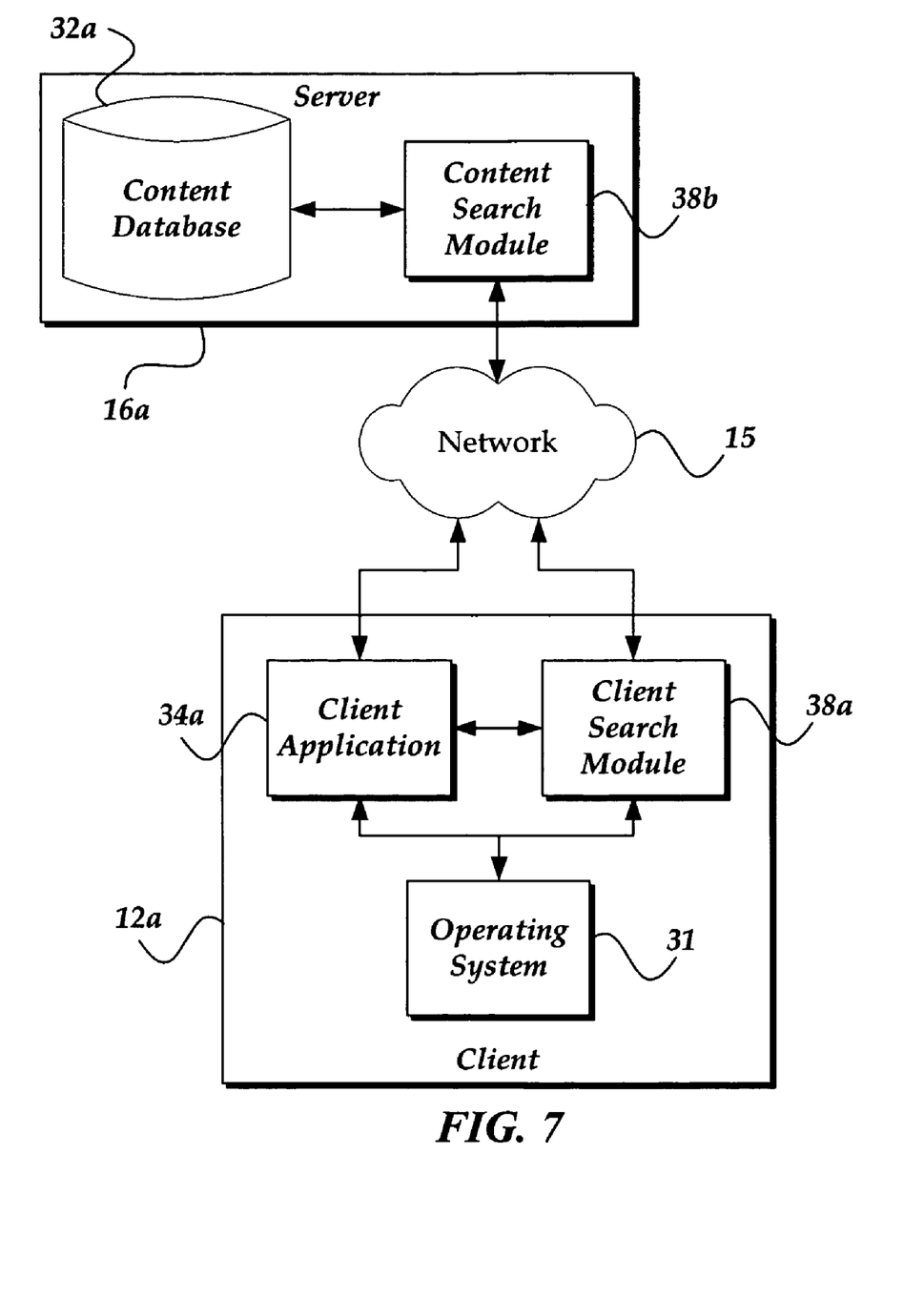
FIG. 7 is a block diagram illustrating an architecture that may be used to implement an embodiment of the invention.

FIG. 7 is a block diagram illustrating an architecture that may be used to implement an embodiment of the invention. All of the following elements may be operated on a single computing device or further distributed over a number of computing devices. In this example, a client 12a includes operating system 31, a client application 34a, and a client search module 38a, which all communicate with each other. Client search module 38a may comprise a stand alone application, a plug-in module for client application 34a, a downloaded applet, and/or a combination of executable modules. Client search module 38a generates a selection icon and detects a location at which the selection icon is dropped in a window in which client application is running or other portion of the display area. Client search module 38a may use a system-wide hook and/or other utility of operating system 31 to detect the drop operation, determine the location of the selection icon, and/or evaluate the selected word(s) to determine a determined word. Client search module 38a communicates the determined word through network 15 to a content search module 38b of a server 16a. The communication may comprise an HTTP message or other request message.

Content search module 38b is in communication with a content database 32a, which may include definitions, translations, pronunciations, audio content, encyclopedia entries, and/or the like. Content search module 38b performs a search of content database 32a for information relevant to the determined word. Content search module 38b may generate a markup document or other response message that includes the search results. Content search module 38b returns the search results to client search module 38a, which displays the results in a results window.

Figure 8:
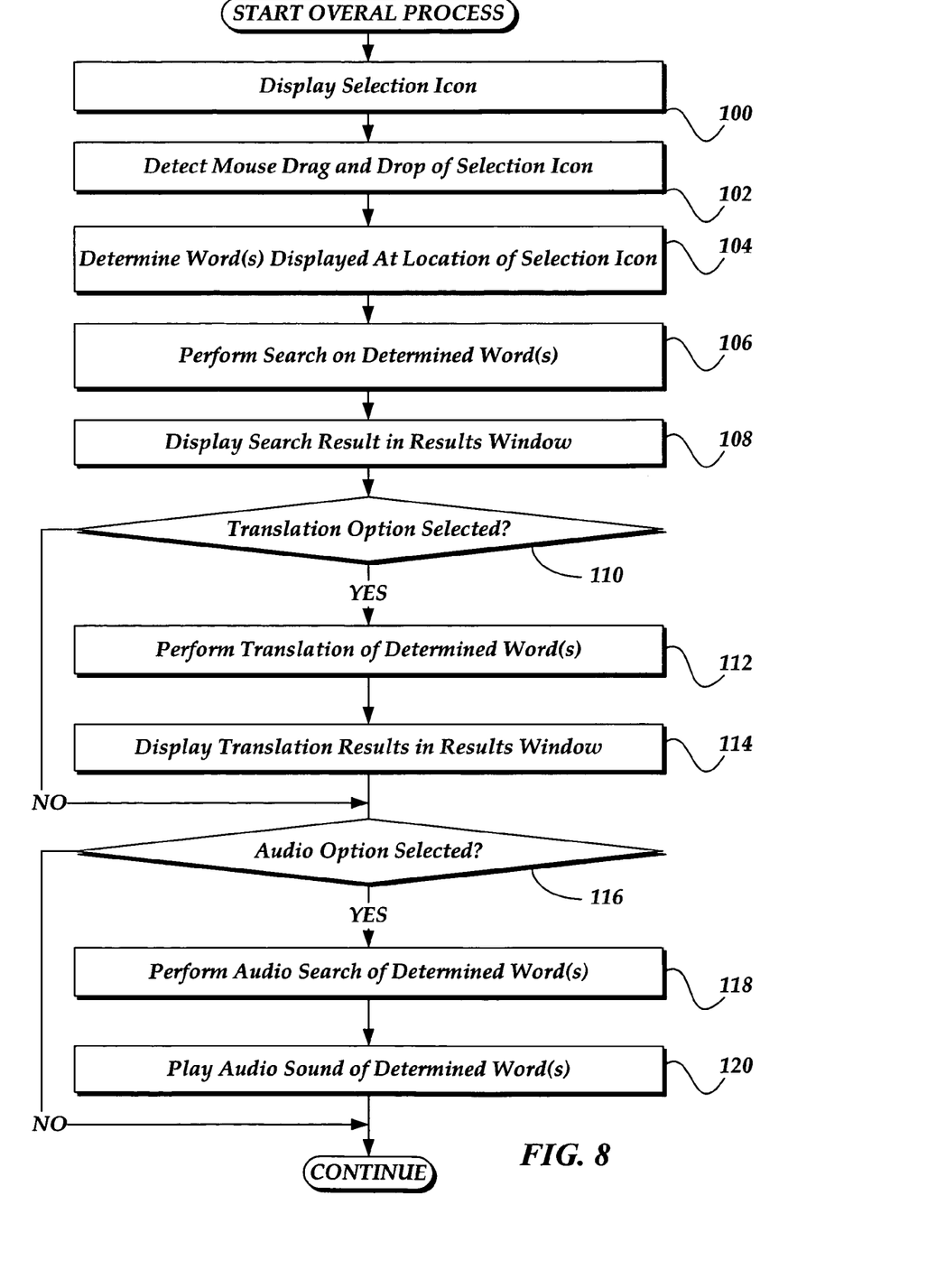
FIG. 8 is a flow diagram illustrating logical operations for an exemplary embodiment.

FIG. 8 is a flow diagram illustrating logical operations for an exemplary embodiment. This embodiment is discussed in terms of a single computing device to evaluate a word, but the operations may be distributed over multiple computing devices to evaluate a symbol or other display element. At an operation 100, a search module is initiated and displays one or more selection icons that may be used to select words, symbols, images, and/or other elements in the display. At an operation 102, the search module detects a mouse drag and drop of the selection icon. The selection icon may be set to stay positioned at the drop location relative to the window, such that the selection icon would move as the contents of the window were scrolled. This would ensure that the selection icon remained associated with a selected word (or symbol, etc.). Alternatively, the selection icon may be set to stay positioned at the drop location relative to the origin of the display area. Scrolling may visually disassociate the selection icon from the selected word. A new selected word would generally not be identified until after another drop operation, although a new selected word may be identified after scrolling stopped. The selection icon may be treated like any other icon by the operating system, such that an operating system hook and/or other utilities may be used to determine the location of the selection icon. The utilities or the search module may also determine the location of a particular portion of the selection icon, such as the area near the point of the push pin shown in FIGS. 3 and 4. The portion of the selection icon may be used as a selection area within which the search module starts to evaluate a selected word.

At an operation 104, the search module evaluates the text characters at the location of the selection icon to determine a word or words. The search module may use operating system hooks and/or other utilities to determine the text characters and spaces that separate the characters into words. Alternatively, the search module may access a corresponding application to evaluate source information that is used to render data displayed in a window. For example, the search module may evaluate a markup document that is the source of data currently displayed in a browser window. The search module may also use rules to check for related words near the location of the selection icon. For example, the search module may detect the word "instrument." However, to perform a relevant search, the search module may evaluate one or more preceding or subsequent words to determine whether the word "instrument" refers to a musical instrument or a medical instrument. The search module may further evaluate an entire paragraph, page, or other extended group, to determine context and/or other information. The extent of evaluating words may be controlled by a selectable setting.

When the word or words are determined, the search module performs a search based on the determined word(s) at an operation 106. As discussed above, the determined word(s) may be submitted to a separate search database at a remote server. Alternatively, some or all of the search may be performed locally. For example, a dictionary search may be performed locally, while an encyclopedia search may be performed by a remote computing device. The remote search may be done based on a user request, or automatically done in the background to cache information for faster retrieval if the user selects a tab corresponding to the encyclopedia search. At an operation 108, the search results are formatted and rendered in a separate results window on the display.

At a decision operation 110, the search module detects whether a translation tab or other translation option was selected. If a translation option is selected, the search module performs a translation of the determined word(s) at an operation 112, or submits the determined word(s) to a translation module. At an operation 114, the search module formats the results and renders the results in the results window. As discussed above, a translation may be performed automatically as part of the initial search or done as a background operation and cached. If a translation option was not selected, operations 112 and 114 are skipped.

Similarly, at a decision operation 116, the search module detects whether an audio button or other audio option was selected. If an audio option is selected, the search module performs an audio search, or otherwise accesses audio data related to the determined word(s) at an operation 118. At an operation 120, the search module prepares and plays the audio data through a speaker. As discussed above, an audio search may be performed automatically as part of the initial search or done as a background operation and cached. If an audio option was not selected, operations 118 and 120 are skipped. Other similar operations can be performed to access encyclopedia entries, images, and/or other content.

The above specification, examples, and data provide a complete description of the manufacture and use of the composition of the invention. For example, an intermediary server can be used to store, compared, filter, and otherwise preprocess presence information, communication modes, and messages, so that results are sent to a desired device such as a mobile terminal. Since many embodiments of the invention can be made without departing from the spirit and scope of the invention, the invention resides in the claims hereinafter appended.

What is claimed as new and desired to be protected by Letters Patent of the United States is:

1. A method for searching, comprising:
   detecting a drag and drop operation of a selection indicator with a pointing device in a display area, wherein the selection indicator is a predefined indicator that is selectively dropped at a user-selected drop location within the display area and is set to be positioned at the user-selected drop location, the display area having content in a first language;
   upon detecting a drop of the selection indicator onto the drop location, determining a symbol previously within the display area at the drop location of the selection indicator, the symbol being different from the selection indicator, and wherein the selection indicator is persistently pinned to the determined symbol during scrolling of the display area having the symbol;
   initiating a search for a plurality of predefined types of content based on the determined symbol that the drop of the selection indicator is performed on; and
   associating each of the plurality of the predefined types of content with at least one of a plurality of selection elements to be displayed in one of a plurality of result windows, the result windows having content predominantly in a second language that is different from the first language.

2. The method of claim 1, further comprising:
   performing the search of content based on the determined symbol; and
   displaying a result of the search in a result window in the display area.

3. The method of claim 2, wherein performing the search comprises:
   communicating the determined symbol to a remote search module with a request to perform a search on the determined symbol; and
   receiving the result of the search from the remote search module.

4. The method of claim 2, wherein the result comprises at least one of the following: a definition of the symbol, a translation of the symbol, an encyclopedia entry associated with the symbol, audio data of a sound of the symbol, and an image associated with the symbol.

5. The method of claim 2, wherein the result window includes at least one selection element, which if selected causes alternate content associated with the determined symbol to be displayed in the result window.

6. The method of claim 1, wherein the selection indicator comprises at least one of the following; an icon, a graphic, an animation, and a locating indicator.

7. The method of claim 1, wherein the selection indicator performs one of the following; a blinking operation, a rotating operation, and an animation operation.

8. The method of claim 1, further comprising at least one of the following:
   activating an input field in which a user may enter a search term, wherein the input field is activated upon detecting a user input activation action associated with the selection indicator; and
   activating a menu from which a user may select at least one of the following; an operation to be performed and a setting associated with the selection indicator, wherein the menu is activated upon detecting a menu activation action associated with the selection indicator.

9. The method of claim 1, wherein the symbol comprises one of the following; a word, a set of words, a language character, a set of language characters, and an image.

10. The method of claim 1, wherein determining the symbol comprises one of the following:
    evaluating data rendered to the display to identify the symbol; and
    evaluating a source of the data rendered to the display to identify the symbol.

11. The method of claim 1, further comprising:
    detecting a drag and drop operation on a second selection indicator with the pointing device in the display area, wherein the second selection indicator comprises a second one of a plurality of separate selection indicators;
    determining a second symbol in the display area at a location of the second selection indicator; and
    initiating a second search of content based on the determined second symbol.

12. The method of claim 11, further comprising displaying a second result of the second search in a second result window in the display area.

13. The method of claim 1, wherein the method is executed by a mobile terminal.

14. A computer readable medium, comprising executable instructions for performing actions of claim 1.

15. A client for searching, comprising:
    a pointing device;
    a display;
    a memory for storing instructions; and
    a processor in communication with the pointing device, with the display, and with the memory, wherein the processor performs actions based at least in part on the stored instructions, including:
    detecting a drag and drop operation of a selection indicator with a pointing device in a display area, wherein the selection indicator is a predefined indicator that is selectively dropped at a user-selected drop location within the display area and is set to be positioned at the user-selected drop location, the display area having content in a first language;
    upon detecting a drop of the selection indicator onto the drop location, determining a symbol previously within the display area at the drop location of the selection indicatorthe symbol being different from the selection indicator, and wherein the selection indicator is persistently pinned to the determined symbol during scrolling of the display area with the symbol;
    initiating a search for a plurality of predefined types of content based on the determined symbol that the drop of the selection indicator is performed on; and associating each of the plurality of the predefined types of content with at least one of a plurality of selection elements to be displayed in one of a plurality of result windows, the result windows having content predominantly in a second language that is different from the first language.

16. The client of claim 15, wherein the processor further performs the actions of:

performing the search of content based on the determined symbol; and displaying a result of the search in a result window in the display area.

17. The client of claim 15, further comprising a communication interface in communication with the processor and with a remote computing device, and wherein the processor further performs the actions of:

communicating the determined symbol to the remote computing device with a request to perform a search on the determined symbol; and receiving a result of the search from the remote computing device.

18. A method for providing a search result, comprising:

receiving a request to perform a search for content associated with a symbol determined within a display area at a user-selected drop location of a selection indicator, the selection indicator being detected as dragged and dropped to the user-selected drop location, the display area having content in a first language, the symbol being other than the selection indicator, wherein the selection indicator is a predefined indicator and is set to be positioned at the user-selected drop location, and wherein the selection indicator is persistently pinned to the determined symbol during scrolling;

performing the search for a plurality of predefined types of content based on the determined symbol that the drop of the selection indicator is performed on; and providing a result for display in a window of the display area, wherein each of the plurality of the predefined types of content is associated with at least one of a plurality of selection elements to be displayed in one of a plurality of result windows, the result windows having content predominantly in a second language that is different from the first language.

19. The method of claim 18, wherein the method is executed by a server in communication with a client that determines the symbol and submits the request.

* * * * *

UNITED STATES PATENT AND TRADEMARK OFFICE
CERTIFICATE OF CORRECTION

PATENT NO. : 7,827,503 B2
APPLICATION NO. : 11/190685
DATED : November 2, 2010
INVENTOR(S) : Jeong Sik Jang Page 1 of 1

It is certified that error appears in the above-identified patent and that said Letters Patent is hereby corrected as shown below:

In column 10, line 61, in claim 15, delete "indicatorthe" and insert -- indicator, the --, therefor.

Signed and Sealed this
Twelfth Day of April, 2011

David J. Kappos
*Director of the United States Patent and Trademark Office*